United States Patent
Zayas et al.

(10) Patent No.: US 6,215,861 B1
(45) Date of Patent: Apr. 10, 2001

(54) SYSTEM AND METHOD FOR NUMBER PRESENTATION

(75) Inventors: Patrik Zayas; Daniel Benitez, both of Uppsala (SE)

(73) Assignee: Microtel Technology AB, Uppsala (SE)

(*) Notice: Subject to any disclaimer, the term of this patent is extended or adjusted under 35 U.S.C. 154(b) by 0 days.

(21) Appl. No.: 09/063,062

(22) Filed: Apr. 21, 1998

Related U.S. Application Data

(63) Continuation of application No. PCT/SE96/01340, filed on Oct. 23, 1996.

(30) Foreign Application Priority Data

Oct. 24, 1995 (SE) .................................................. 9503732

(51) Int. Cl.[7] .................................................. H04M 11/00
(52) U.S. Cl. ..................... 379/93.07; 379/142; 379/88.21
(58) Field of Search ............................. 379/88.19, 88.2, 379/88.21, 90.01, 93.01, 93.03, 93.05, 93.07, 93.23, 111–114, 120, 127, 142, 156, 177, 183, 353–355

(56) References Cited

U.S. PATENT DOCUMENTS

| | | | |
|---|---|---|---|
| 4,754,475 | * 6/1988 | Pintos et al. | 379/142 |
| 4,873,719 | 10/1989 | Reese | 379/215 |
| 5,282,243 | 1/1994 | Dabbaghi et al. | 379/201 |
| 5,349,638 | 9/1994 | Pitroda et al. | 379/142 |
| 5,655,015 | * 8/1997 | Walsh et al. | 379/142 |
| 5,699,419 | * 12/1997 | Ardon | 379/156 |
| 5,862,203 | * 1/1999 | Wuikan et al. | 379/130 |

* cited by examiner

Primary Examiner—Curtis A. Kuntz
Assistant Examiner—George Eng
(74) Attorney, Agent, or Firm—Young & Thompson

(57) ABSTRACT

A system and a method for collecting and presenting subscriber number information for a calling subscriber sent by CTI system signalling over a stationary telecom network. The system utilizing the method includes for each individual telephone line a line processor (10–15) with a memory (4–9) for buffering. The memory is over a bus (3) interconnected to a central processor or a main processor (1) for collection of the incoming number information of each line. Additionally the system includes a unit for conversion of incoming CTI system signalling at each line processor into binary code constituting number information, each line processor (10–15) further including a number of subfunctions for handling and forwarding of number information received, and each line processor having a unique identification being forwarded together with number information for presentation.

12 Claims, 10 Drawing Sheets

SYSTEM AND METHOD FOR NUMBER PRESENTATION

This is a continuation of copending international application PCT/SE96/01340 filed Oct. 23, 1996, which designates the United States.

TECHNICAL FIELD

The present invention relates to an electronic system to collect information in a number of fixed telecommunication lines for presentation of a caller's telephone number and more exactly a system and a method to, from a multiplicity of lines, collect information of calling numbers for presentation, for instance, at a switchboard.

BACKGROUND OF THE INVENTION

Today there is available a number of known devices for presentation of a caller's telephone number via CTI system signalling (Computer Telephony Integration), e.g., via DTMF (Dual-Tone Multiple Frequency), V.23 or the like to an individual subscriber connection. Private persons today have the possibility to store the latest received calls including time information together with phone numbers obtained from the number presentation for a caller, even if only in a limited extent. Thus, it is possible to later call a person who did call earlier, as the phone number of the person will be known by means of the number presentation for the caller. However there is no possibility for a company to utilize such on the market available caller number presentation devices as available devices only can read one line. Consequently, a totally different system to collect the caller's phone number for presentation of all the lines is needed for a company to be able to bring such information together from several phone lines.

Existing presentation of caller's number in Sweden include calls from private persons, calls from mobile phones within the NMT systems NMT-450 and NMT-900 and from mobile phones of the GSM distributors Telia and Europolitan. The presentation of a caller's phone number does not include restricted phone numbers, i.e. subscribers having a secret phone number, and also still no calls from the GSM distributor ComViq, but the phone numbers of this distributor will most probably in a short time be available. A subscriber's phone number concerning an international call is however not yet presented, but the Swedish telephone distributor Telia do have plans to introduce presentation of caller's number also for calls from abroad.

Presentation of caller's number from technical reasons does not include telephone subscriptions not connected to a suitable exchange system, but these systems are continuously expanded and today there are few subscribers who are not connected to such a type of exchange not offering this facility.

There is therefore a demand for a system which will present numbers from a multiplicity of lines simultaneously, whereby, for instance, a company then should be able, e.g. to make statistics over received calls and divide the incoming calls to the company such that a certain client always basically can get the same contact person guided by the subscriber number of the call. Such a system should also preferably store a subscriber number calling the company after closing hours, when nobody is available at the company and can answer the telephone.

SHORT DESCRIPTION OF THE INVENTION

A primary objective according to the present invention is to offer, for instance, companies having a multiplicity of incoming telephone lines, a number of advantages and possibilities which hereby may be obtained by utilizing the phone distributor's supply of a number presentation service.

A second objective is to also facilitate the work for an exchange operator, who no longer will have to personally respond to all incoming calls but may directly forward those to a suitable connection.

According to a first object of the present invention an external system for collection and presentation of subscriber number information of a calling subscriber transferred by CTI system signalling over a stationary network is disclosed, the system for each separate telephone line comprises a line processor with a memory for buffering, which additionally over a bus line is connected to a central processor or a main processor for collection of incoming number information of each line, a unit for conversion of incoming information signalling at each line processor to binary code constituting number information, each line processor further including a number of subfunctions for handling and transfer of received number information, and each line processor having a unique identity which is transferred to the central processor together with the number information for presentation.

According to a second object of the present invention a method for number presentation is disclosed for a multiplicity of incoming telephone lines utilizing subscriber number information for calling subscribers transferred by CTI system signalling over a stationary network, the method comprising the steps of connecting each incoming line to a line processor over a CTI converter for reception of transferred subscriber number information, conversion in the line processor of the information signals, by means of a subfunction, into a binary code for buffering in a memory, and transfer of the binary code and an unique address of the line processor, by means of a second subfunction, over a common bus to a central processor or a main processor having a main function of collecting and handling incoming number information.

DESCRIPTION OF THE DRAWINGS

The invention will be described in the form of a preferred illustrative embodiment and by means of the attached drawings in which same numerals indicate the same or corresponding members and in which.

DESCRIPTION OF AN ILLUSTRATIVE EMBODIMENT

The system and the method according to the present invention will facilitate the workload, for instance, for a switchboard operator at a company in that this person will not have to answer a call every time to get the information of whom a calling person is looking for. The switchboard operator will be able to forward the call to the proper person of the company without answering as, due to an external system in relation to the switchboard, in accordance with the invention, it will be known which subscriber is calling. The prerequisite then only being that the person in question did call once before and thereby was stored as a previous customer.

Consequently, statistics may easily be transferred, e.g., from where a call comes, who is often calling or which time of the day being most loaded by telephone traffic. Companies may even use the system to drop undesired calls by not responding to the displayed number.

Figure 1:
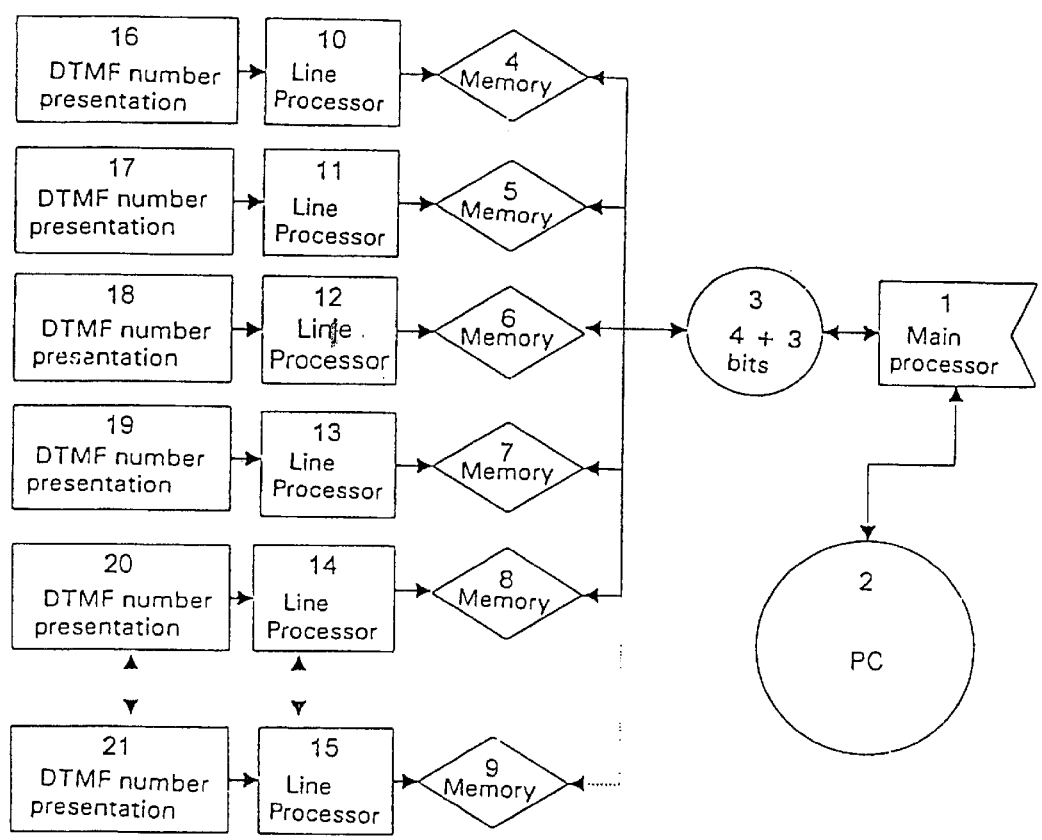
FIG. 1 is an illustrative summary of the operation of a collecting system for subscriber number presentation according to the present invention together with a personal computer by which collected subscriber numbers are presented, stored and further processed.

In FIG. 1 is shown an illustrative summary of the function of the operation of a collecting system for a subscriber number presentation according to the present invention together with a personal computer in which collected subscriber numbers are stored. In the particular illustrative example the signalling is relying on DTMF signalling, but any other CTI signalling protocol may be used as well. The system according to the invention is based on a processor on each incoming line, the processor storing the subscriber number information of a received call in a memory. Each line processor is interconnected to a central processor which in proper order collects the information from each line processor. The central processor then transfers received information to a personal computer. The information stored by the line processors is the subscriber number presentation which the telephone distributor, for instance Telia, transmits at each incoming call, presupposed that this service was ordered. The subscriber number presentation is a verified and well operating system, which in Sweden covers almost the entire network.

In FIG. 1 is shown, in an illustrative embodiment, a summary of the system build-up, in which a main processor 1 collects information from a number of line processors 10–15 and transfers this to a personal computer 2 (PC). The information collected by the line processors 10–15 arrives from a DTMF converter, which according to the state of the art generates 4 bits data information from the signalling frequencies on the incoming lines 16–21. This information normally is referred to as Caller_ID. Each line processor 10–15 stores information in a memory 4–9 during the time a common bus 3 with 4+3 bits is busy. When the bus 3 is free, the respective line processor 10–15 transfers the information stored in the memory 4–9 over the bus 3 to the main processor 1, which in turn further transfers the information to a PC 2.

Figure 8:
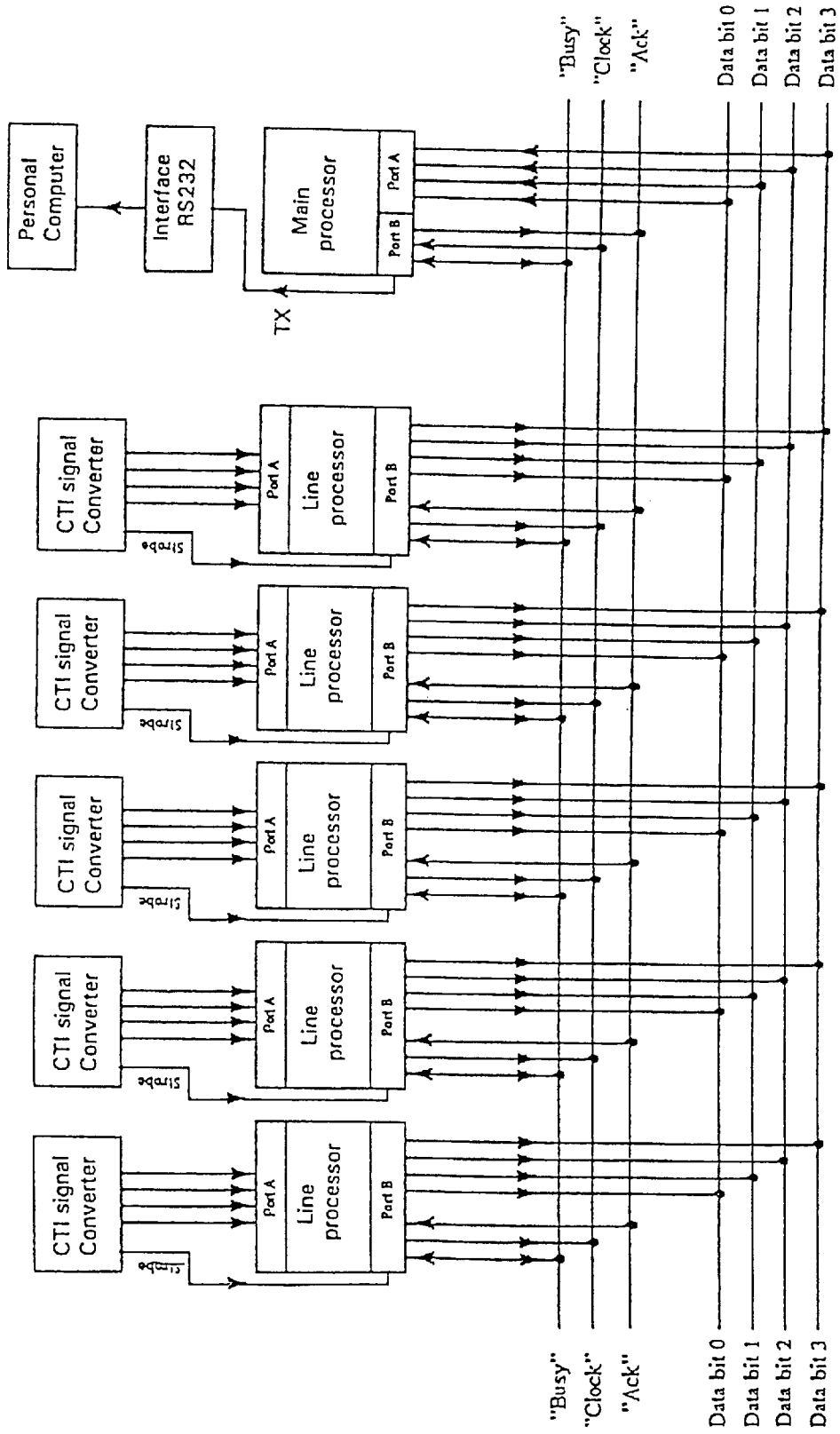
FIG. 8 is an illustrative description of connection to a data bus, the information transfer being carried out by four data bits and control by the signals BUSY, CLOCK, ACK.

Connections of the line processors is further shown in FIG. 8.:

Port A=One incoming connection with 4 bits for reading information from the DTMF converter, Port B=One incoming connection for reading the signal STROBE with one bit (STROBE=bit indicating that there is information to read), one input and output connection for reading/writing of the signal BUSY with one bit (BUSY=bit indicating that the bus is occupied), one incoming connection for reading of the signal ACK with one bit (ACK=bit indicating that the main processor read transferred information), one outgoing connection for indication of signal CLOCK (CLOCK=bit indicating that there is information to read on the bus data bits), and outgoing connections for handing four bits of data information.

Connections of the main processor is the corresponding:

Port A=One incoming connection for reading of four data bits of the bus,

Port B=Connection of three signal bits of the bus, out of which one input and output connection for reading/writing of the bit for the signal BUSY, one outgoing connection for writing of the bit for the signal ACK, and one incoming connection for reading of the bit for the signal CLOCK and further an outgoing connection for one bit TX indicating transmission of data serially, for instance, to a personal computer.

Figure 2A:
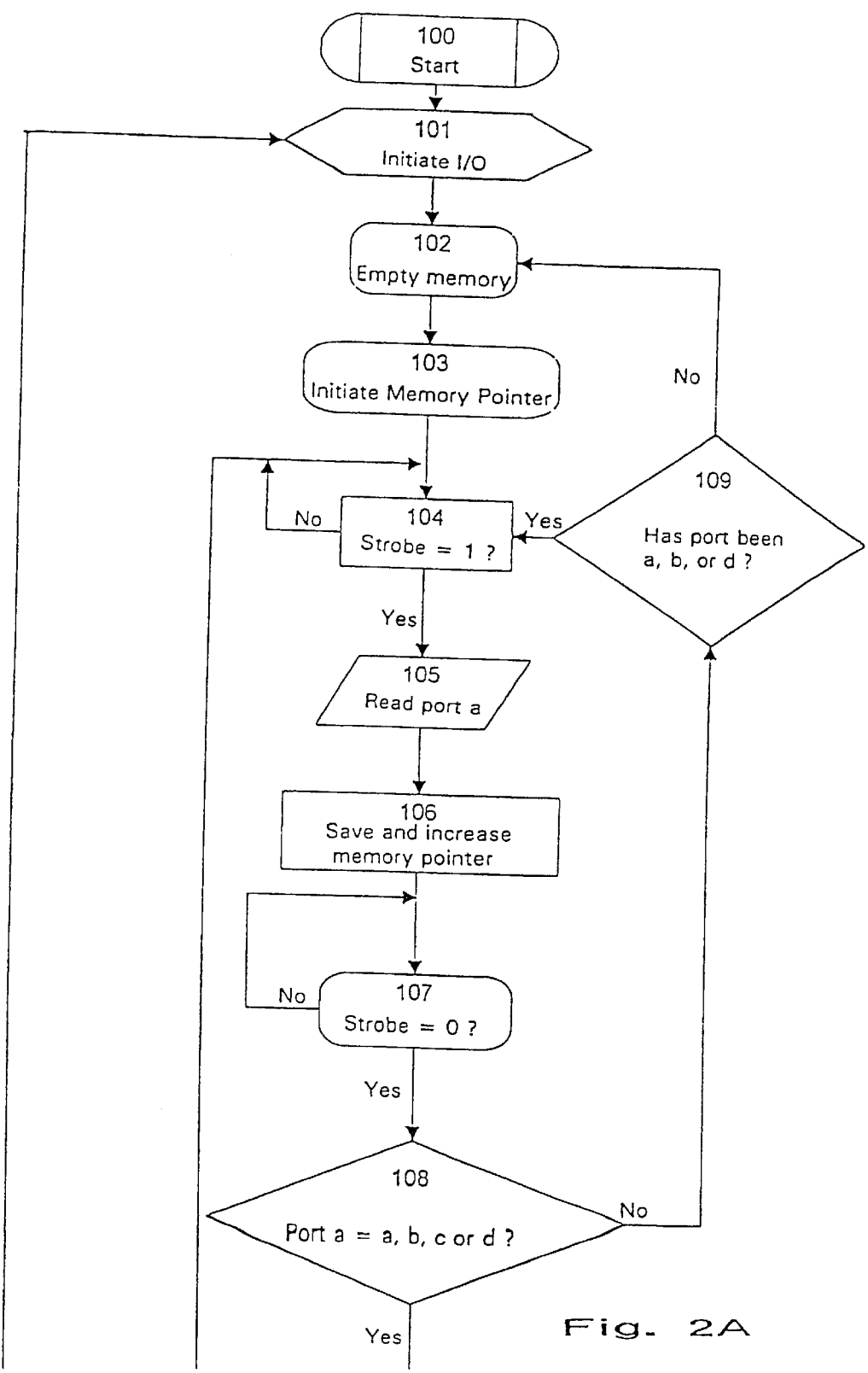
FIGS. 2A and 2B show in two parts a flow chart of an internal main function for a number of line processors in an illustrative embodiment according to the invention.
Figure 2B:
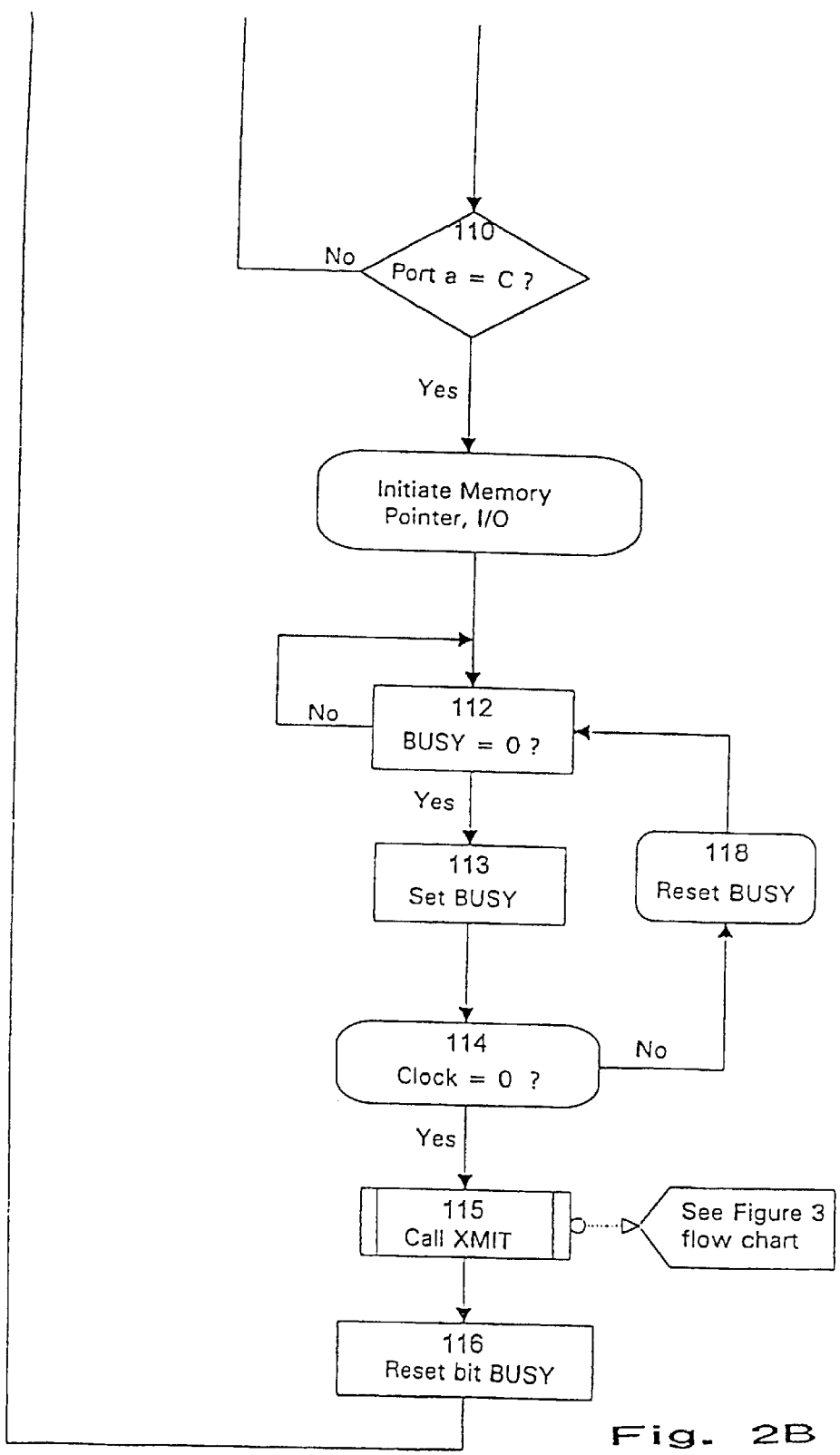

In FIGS. 2A and 2B the internal function of the line processors 10–15 is demonstrated by a flow chart, in which it is indicated how the reading of incoming information is handled. Step 100, Start, for example sets interrupt handling, memory pointers, variables, processor type and connection information. To be able to read and write information, respectively, input and output ports (I/O) must be initialized, whereby this takes place in step 101. The initialization tells which connections are to be used for reading and writing. To make certain that no rubbish data is kept in the memory, in which incoming information is to be stored, the memory is emptied in step 102. The position in the memory where the first character is to be written is initialized in step 103. This position or memory pointer is incremented when a character has been read and written to the current memory pointer in step 106. The line processor stops and waits that there will be information to be read, whereby this takes place after the connection STROBE is set at step 104. Now the line processor at step 105 can read port A, which now contains the first character of the subscriber number presentation string. The DTMF converter holds the connection STROBE set when there is signal frequencies to read. When the signal frequencies disappears the connection STROBE is reset at step 107. A verification that a number presentation string may be read must take place not to read a lot of rubbish information characters. Valid initialization characters are A, B or D in step 108.

If a valid initialization character is not the first character read the incoming number presentation string is not valid and is dropped immediately in step 109. When a string is read this is confirmed by a character C in step 110 (FIG. 2B). If confirmation is not achieved by the character C the operation returns to step 104 in FIG. 2A.

When a valid number presentation string has been completely read, it should be sent to the main processor, which operation is indicated in FIG. 2B. New initialization of the memory pointer and the port to send the number presentation string takes place to change the active connections of the line processor into outputs instead of inputs. The memory pointer is set to the character first read in the number presentation string at step 111. At step 112 a check whether the bit BUSY is set. If the bit for BUSY is set the bus is occupied at the moment. The line processor then waits for the bus to be free. When the bus becomes free the bit BUSY is set at step 113 to mark that the bus is used by this line processor. (Consequently, no other line processor will be able to use the bus as long as this line processor has the BUSY bit set). For an extra safety check the bit CLOCK is not allowed to be set, and if it is set the BUSY bit will be reset in step 118 and a new check takes place. The line processor now calls a subfunction called XMIT, which is illustrated in the flow chart of FIG. 3. The subfunction now transfers the number presentation string stored in the memory. When the subfunction is finished the bit BUSY is reset in step 116 and the operation restarts at step 101 (FIG. 2A).

Figure 3:
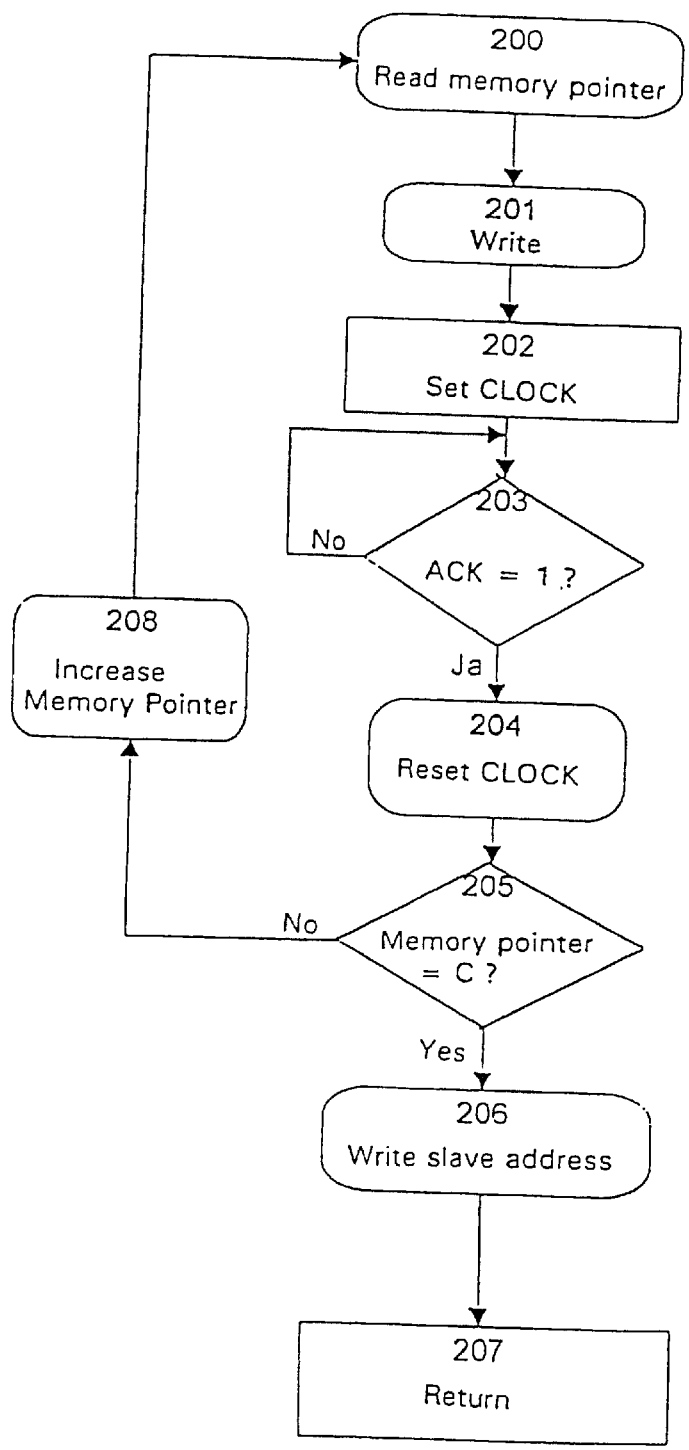
FIG. 3 shows a flow chart illustrating an internal subfunction XMIT for the line processors according to the invention and specifically in the form of a character transfer routine to a main processor.

In FIG. 3 is demonstrated how the transfer of the number presentation string, stored in the memory, takes place. The function writes one character, read from the memory in step 200, by the data bits at port B in step 201. Thereafter the bit CLOCK is set. This bit tells the main processor that there is information to be collected on the bus. When the main processor has read the data bits, the main processor sets the bit ACK and tells the line processor that it has finished the reading. The line processor waits in step 203 for the bit ACK to be set. Now when one character is written to the data lines of the bus and the main processor has read the character, the bit CLOCK is reset in step 205 and a check of the memory pointer is performed. The content of the memory pointer being equal to C in step 205 means that the complete number presentation string is written. If not the memory pointer is incremented in step 208 and a new reading and a new writing take place until the entire number presentation string is written. In order to have the main processor to know from which line the information comes, the unique address of the current line processor is transferred out onto the data lines of the bus in step 206. Also now a confirmation through the main processor will take place. The confirmation is equal to the steps 202–204. The line processor now is ready and returns from step 207 to step 115 of the main function (FIG. 2B).

Figure 4A:
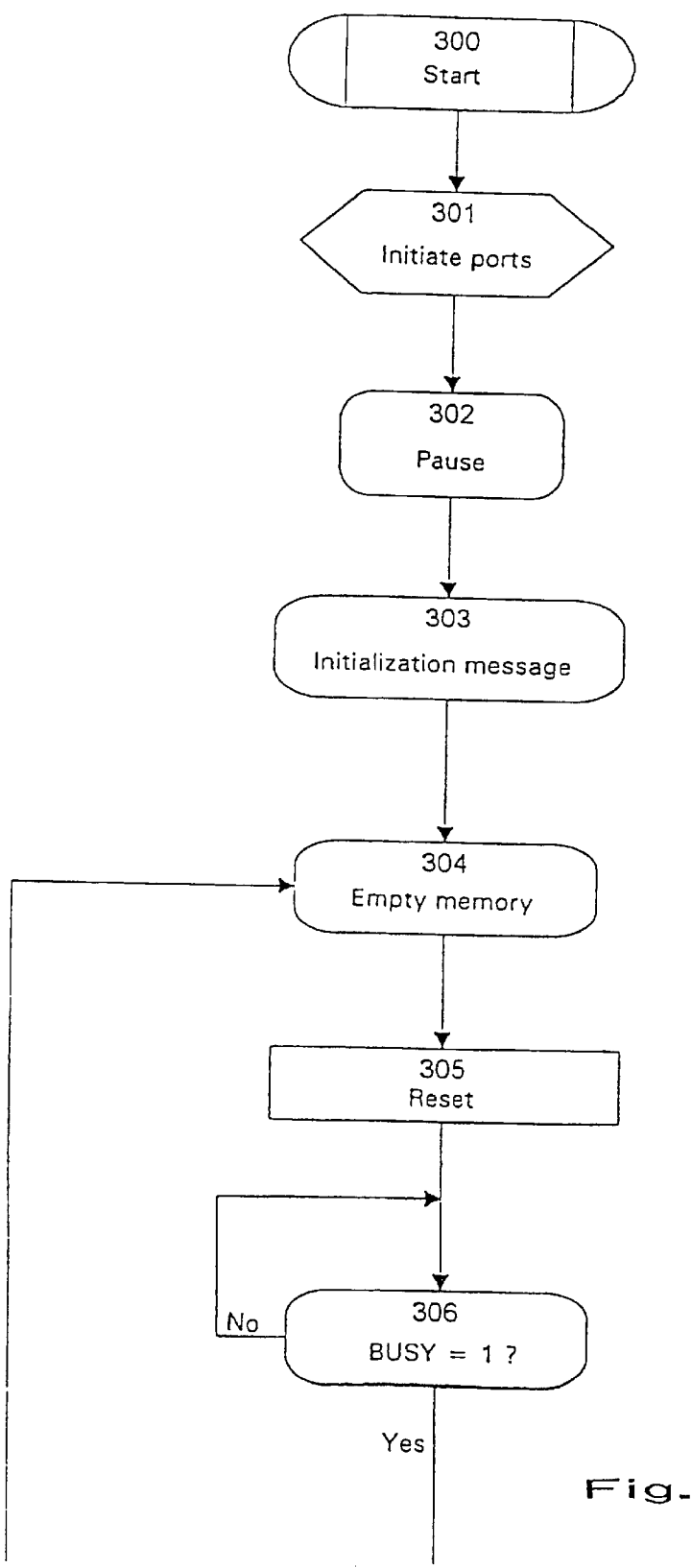
FIGS. 4A and 4B show in two parts additionally a flow chart of the main function of the main processor.
Figure 4B:
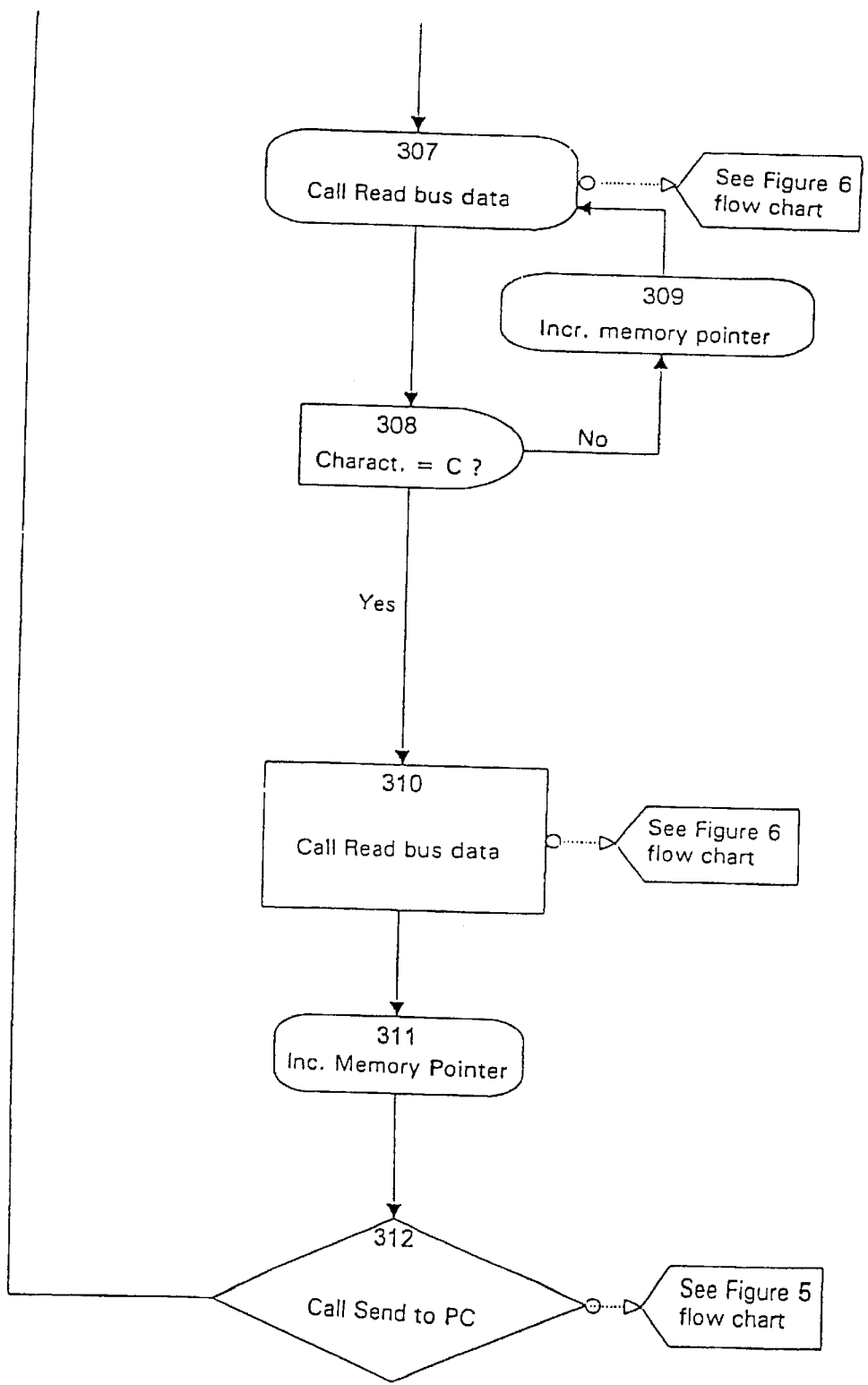

In FIGS. 4A and 4B the internal operation of the main processor is described by a flow chart showing how the reading of incoming information is handled. The step 300, Start, adjusts interrupt handling, memory pointers, variables, processor type and connection information. To be able to read and write, respectively, the I/O ports must be initialized, which takes place in step 301. To make certain that no rubbish data is kept in the memory, into which incoming information is to be stored, the memory is emptied in step 304, and the memory pointer and the character counter are reset in step 305 by the same reason. As a precaution a longer pause of 1 second (long in this context) is introduced in step 302 before an initializing message in step 303 is sent to the personal computer 2 telling that the entire system is ready to start working. The main processor waits until the bit BUSY is set in step 306 before it starts the reading of incoming data. To read incoming data the main function of the main processor in step 307 (FIG. 4B) calls a subfunction called Read Bus Data, also see FIG. 6. If the character read is not equal to the finishing character C in step 308 the character counter should be incremented i step 309 and a new call be performed in step 307 of Read Bus Data for the reading of the next character. When an entire number presentation string is read a unique line processor address must be read in step 310 for the main processor to know from which line the number presentation comes. This takes place by again calling the function Read Bus Data at step 310. When the unique address has been fetched, it is saved after the number presentation string in the memory and the character counter is incremented by the length of the address in step 311. The main processor calls Send To PC in step 312, which subfunction is demonstrated in FIG. 5, to transfer the number presentation string, stored in the memory, to the personal computer 2. When the number presentation string has been transferred the memory is emptied in step 304 (FIG. 4A) to be able to receive next number presentation string.

Figure 5:
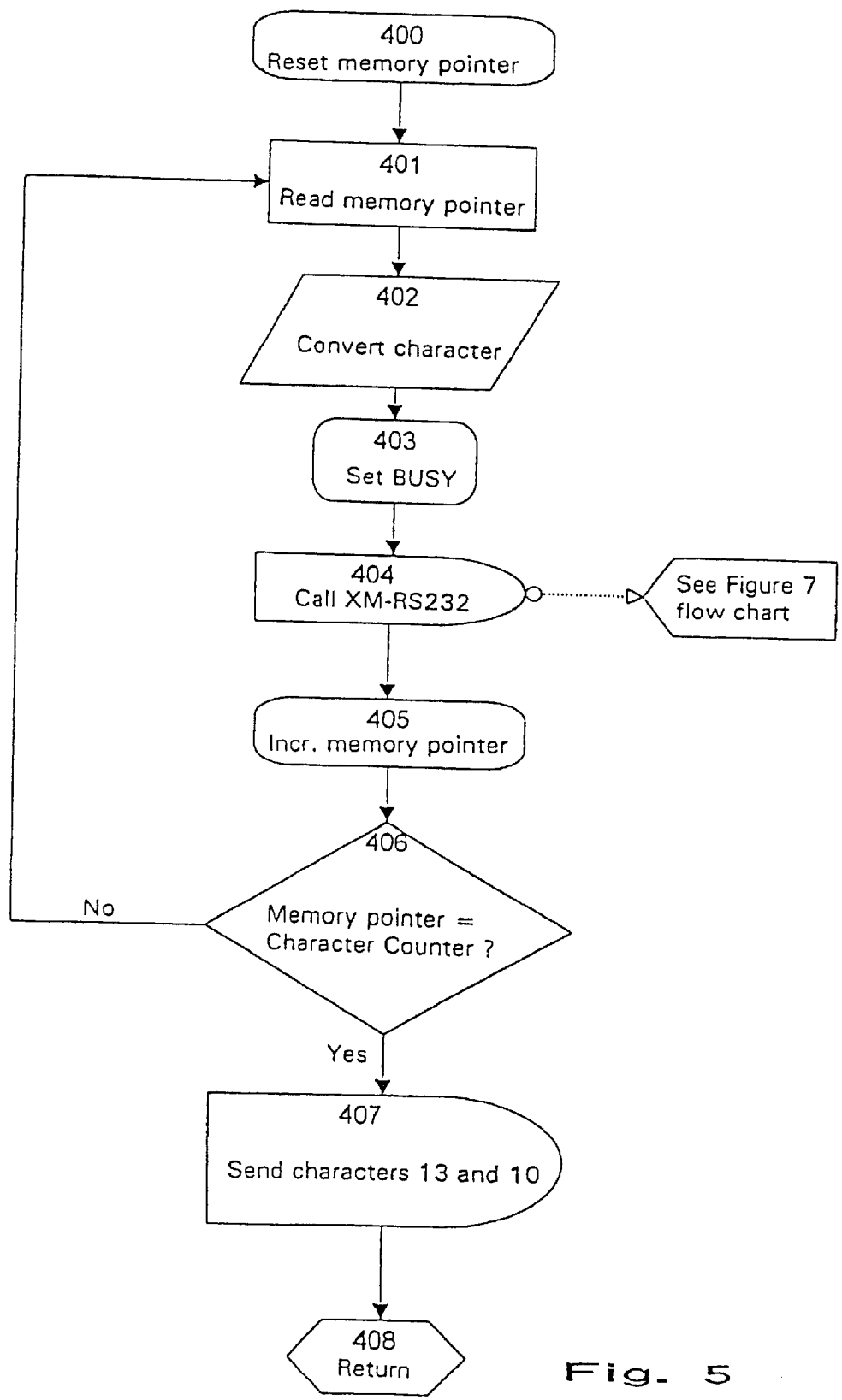
FIG. 5 is an illustrative flow chart of another of the subfunctions of the main processor, Send to PC, and specifically in the form of a character transfer routine to a personal computer.

In FIG. 5 the subfunction Send To PC of the main processor is described. This function now transfers the information, now stored in the memory, to a personal computer by first zero setting a memory pointer in step 400 such that it points to the first stored character in the memory. Subsequently the main processor, in step 401, reads the first character by means of the memory pointer and converts this character from the 4 bits binary DTMF code into an 8 bit binary code in step 402 according to the following table I.

TABLE I

| Binary DTMF | Decimal | DTMF Code in | Binary ASCII |
|---|---|---|---|
| 0000 | 0 | "D" | 01000100 |
| 0001 | 1 | "1" | 00110001 |
| 0010 | 2 | "2" | 00110010 |
| 0011 | 3 | "3" | 00110011 |
| 0100 | 4 | "4" | 00110100 |
| 0101 | 5 | "5" | 00110101 |
| 0110 | 6 | "6" | 00110110 |
| 0111 | 7 | "7" | 00110111 |
| 1000 | 8 | "8" | 00111000 |
| 1001 | 9 | "9" | 00111001 |
| 1010 | 10 | "0" | 00110000 |
| 1011 | 11 | "*" or 0x2A | 00101010 |
| 1100 | 12 | "#" | 00100011 |
| 1101 | 13 | "A" | 01000001 |
| 1110 | 14 | "B" | 01000010 |
| 1111 | 15 | "C" | 01000011 |

Figure 7:
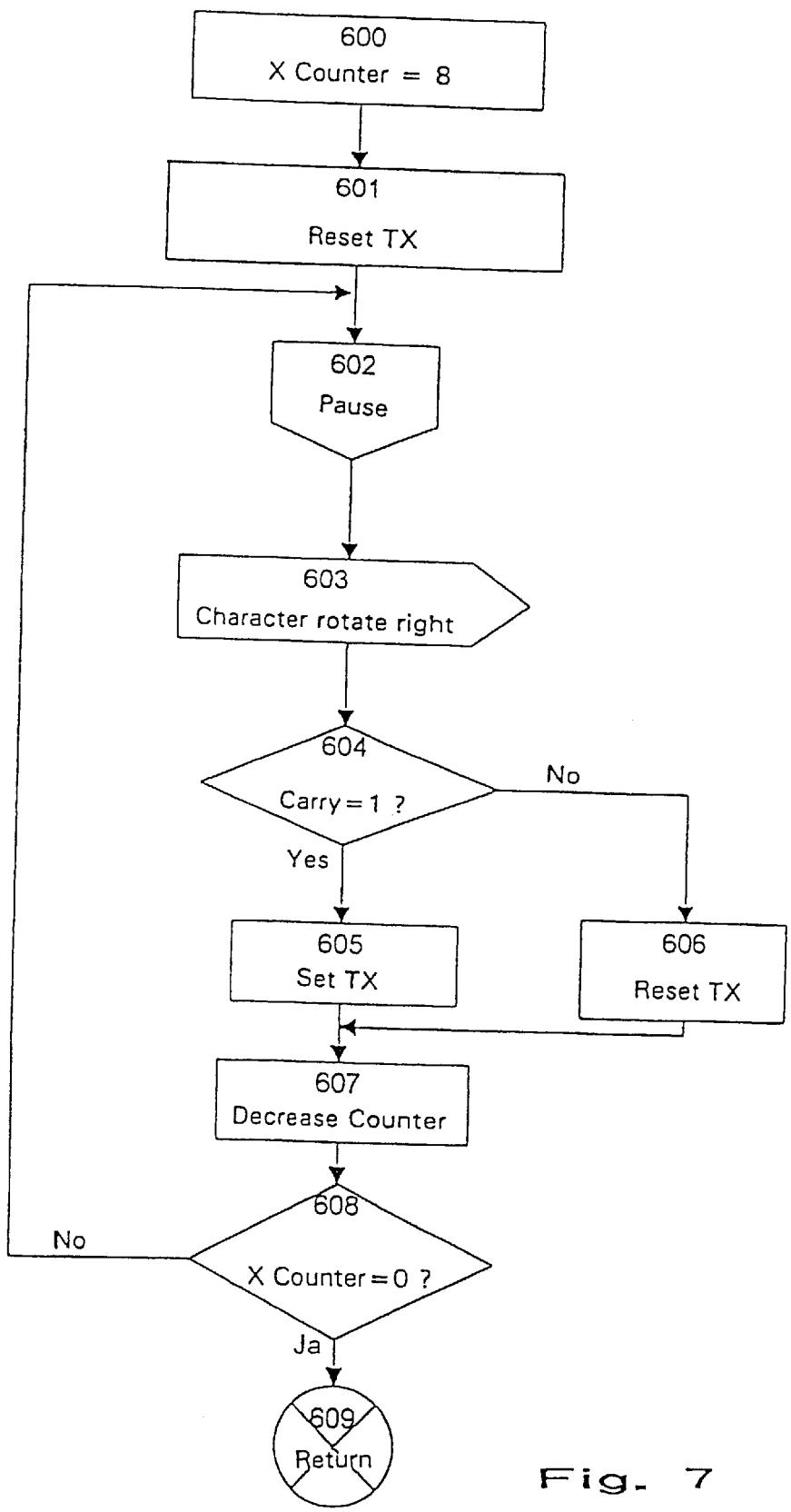
FIG. 7 is an illustrative flow chart of still another of the subfunctions of the main processor, XM-RS232, and specifically in the form of a subfunction of FIG. 5 for asynchronous transmission of characters to the personal computer.

In order that no line processor should send any number presentation string during the time period when the main processor is busy by sending the number presentation string stored in the memory, the main processor sets the bit BUSY in step 403 and calls in step 404 a subfunction called XM-RS232, also see FIG. 7, to transfer the character over the usual interface RS232 with a speed of 9600 bits per second according to the state of the art. When the character is sent the memory pointer is increased in step 405 such, that it points to the next character. If the value of the memory pointer in step 406 should agree with the value which the character counter contains, the entire number presentation string has been transferred and then only characters for line return and line feed should be sent in step 407, and which have the values #13 and #10 according to the ASCII character table of the accepted standard. Now the subfunction is finished and returns in step 408 to the step 312 of the main function (FIG. 4B).

Figure 6:
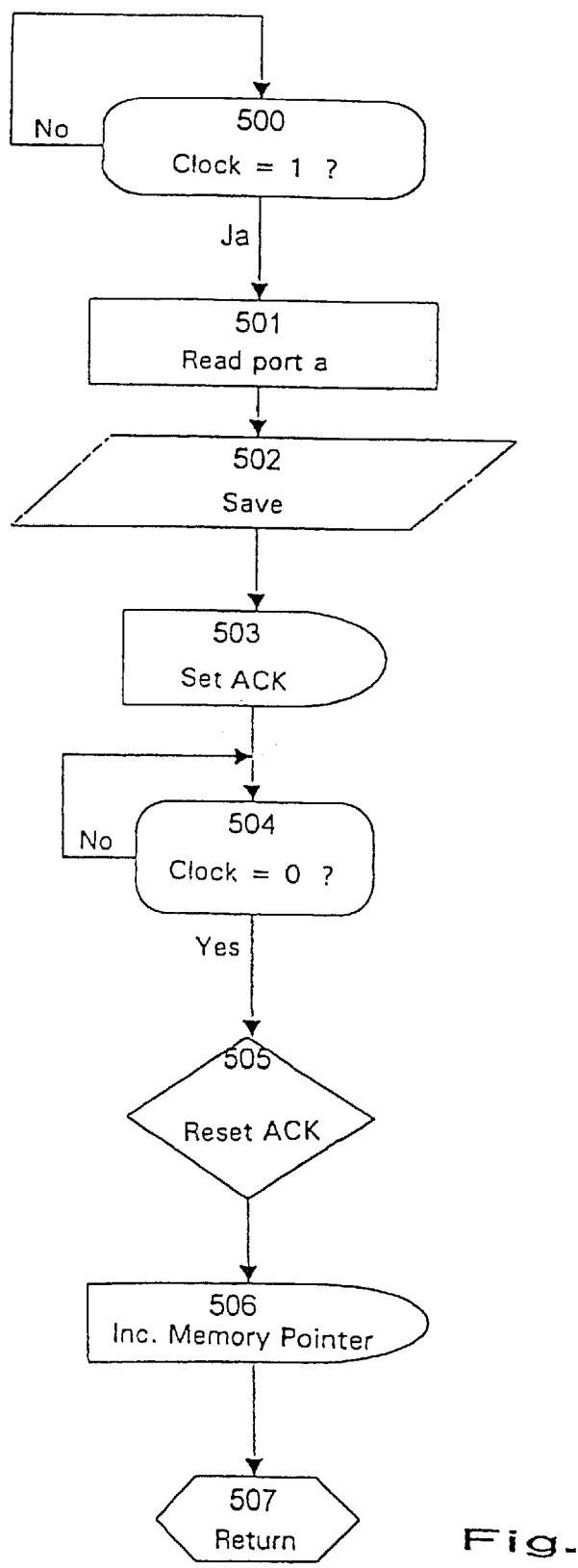
FIG. 6 is an additional illustrative flow chart of another of the subfunctions of the main processor, Read Bus Data, and specifically in the form of a character reception routine from the line processors.

In FIG. 6 is described one of the subfunctions of the main processor called Read BUS DATA. Each time the bit CLOCK is set in step 500 there is a character to read from the four data lines. The main processor in step 501 reads port a, which is connected to the bus and stores the read character onto the memory pointer in step 502. In order to have the line processor, which sent the character, to know that the main processor has read the character the bit ACK is set in step 503. The line processor will reset the bit CLOCK and the main processor must wait for this in step 504. When the bit CLOCK is reset the main processor resets the bit ACK in step 505 and subsequently in step 506 increases the memory pointer such that it points to the memory position where the next character is to be stored. One character now has been read and stored in the memory and the subfunction returns in step 507 to the main function either at step 307 or step 310 dependent from where the call to the subfunction originated.

In FIG. 7 a further subfunction to the subfunction Send to PC called XM-RS232 is described. This additional subfunction sends a character over an interface RS232 with the speed of 9600 bits per second. The protocol being standardized uses 9600 bits per second, 8 bit character length, no parity, 1 stop bit, which according to current terminology is denoted as 9600,8,N,1. The subfunction in FIG. 7 sets a counter called X counter to 8 in step 600, which corresponds to the character length of 8 bits. According to a standardized asynchronous character transfer first a start bit is needed and it corresponds to a zero and therefore the bit TX, corresponding to this bit to be sent, over the data transfer connection being used, is reset to zero. In order to then have the transfer take place at the correct speed a precisely calculated pause in step 602 is needed and which is controlled by the clock frequency of the main processor as a reference. The character to be sent is then binary rotated one step to the right in step 603, which results that the bit to be sent lands as the status register bit called Carry of the main processor. If the bit Carry is set in step 604 the bit TX should be set in step 605, otherwise the bit TX should be reset to zero in step 606. Now a bit is sent and the subfunction decrements the number of bits being left to be transferred by decrementing the X counter in step 607. If the X counter should be zero in step 608 the entire character has been sent and the subfunction at step 609 returns to the calling subfunction, i.e. step 404 of the subfunction Send to PC. Otherwise another pause is made in step 602, the character is rotated one step to the right in step 603 and so on according to FIG. 7.

In FIG. 8 is described a summary of the directions of the data flow previously described as well as interconnection between the main processor and the line processors. Besides, FIG. 13 demonstrates to which ports all the different bits of data information is connected. The different functions and subfunctions may by a person skilled in the art be achieved by either a suitable hardware in the form of an electronic circuitry comprising for instance logic gates, counters, shift registers and memories or by means of a corresponding software preferably stored in a directly executable code adopted to the selected processor carrying out the functions.

AN ILLUSTRATIVE APPLICATION EXAMPLE

When a person makes a call, the telephone service distributor for instance sends the following number presentation string:

"D018123456C"

Existing codes are for example:

D=Start of Caller_iD (Number presentation string for subscriber number.

C=End of information string

A=Start of Caller_ID for transfer call number.

B=Start of Special Code, which may be for subscriber numbers not connected to AXE, international calls, restricted subscriber numbers, etc.

The number presentation string is stored in the memory of the line processor and forwarded to the main processor as soon as the bus is not being busy. Additionally the unique address of the line processor then is sent to the main processor. The line processor and the main processor in a preferred embodiment is, for instance, a processor manufactured by Microchip Technology Inc. with a type number PIC16C84.

The main processor then for instance receives the following information string: "D018123456C023" in which D=the initialization character, 018123456=telephone number of the calling subscriber, C=end of telephone number and then the unique address 023 of the line processor, which for example could indicate the incoming line number 23. The number of lines could for instance be up to 256 line using eight bits for the address of the line processor, but by increasing the number of bits for this information the line number in practice may be an arbitrary number much larger than 256.

The main processor in turn, after conversion to ASCII, forwards the number presentation string to the personal computer 2, which displays on its screen who is calling. If the person has called previously, the operator at the personal computer, except for information of time and date, may directly see who it is with name and address of the caller, if this person did call before and the operator then entered name and address information for just this subscriber number. For example an information is achieved:

Line 023, Time: 11:11:11, Date: 1995-09-09, 018-123456, Uppsala Borje Borjesson, Hyttans AB
Contact person: Sven Svensson
Last call: 12:13:00, 1995-08-20
Previous case: Operational disturbance in equipment bought.

The operator, or if it is a switchboard operator, thereby can immediately transfer the call to the indicated person in the company, who has been involved with the calling person's earlier case. The switchboard operator does not have to respond to the call to know to whom the call should be transferred. A log over incoming calls is prepared to let the operator see which customers have been calling during a certain period and how the cases have been distributed, for instance, between different administrators. The system also allows functions like, e.g., if a person called when the company was not manned, the operator can afterwards look in the log for the person's telephone number and call this person. The system further is built such that when a call is entered, the switchboard operator also knows on which incoming line the calling person is found. In case the contact person of the company is not available, the switchboard operator can inform the called person by means of the system having in the personal computer program a built-in function for messages between stations in the network of the company. The program of the personal computer is also able to give possibilities for the switchboard operator to drop undesired calls. The system preferably is built-up such, that the computer being connected to the number collecting unit is not forced to only handle the number collecting, but also may be used for other purposes simultaneously as the number collecting takes place.

When a person calls, a window for the number collecting display in front is placed on the screen, and the operator can answer to the incoming call. The system may also by it self inform the contact person, eventually sitting at another station, that now there is a person on a certain line looking for him or her. The operator does not always have to page the contact person looked for.

The primary object according to the disclosed embodiment of the present invention thereby is to offer for instance companies, having a multiplicity of incoming telephone lines, a number of advantages and possibilities, which in this way will be obtained by utilization of the supply of a number presentation service by the telecom distributor. In other words to be able to read who is calling before the first ring signal has arrived. The company can easily register received calls and keep a diary of these in a corresponding way as is offered by simple one-line systems according to the state of the art.

Thus, the second object is to make work easy for switchboard operators, which no longer will have to respond to every incoming call but can transfer those to the proper contact person without having to answer. This also facilitates the complex of problems when the desired person is not available and when the switchboard operator directly can inform the customer that the desired person is not available and the contact person may then via an electronic message be informed that he/she has been looked for by a certain person. Such a system then also replaces a direct phone number system, but offers a larger flexibility to control incoming questions from customers, e.g. upon absence of an ordinary administrator.

Additional purposes of the system is to create a condition for the company to co-ordinate their own existing customer index with the number information received on the incoming telephone lines. A company will thereby be able to present information of the person calling the same moment he or she calls. Additionally statistics may be kept over the telephone traffic to the company as every received call registration is stored and not erased until a particular command is given. Statistics may then be kept over, e.g. how often certain persons call, which time they call, when they last called, how many calls are received during certain periods or from which area code region the persons are calling.

The system and the method according to the present invention may of course be modified and redesigned by a person skilled in the art without departing from the spirit and the scope of the invention being defined in the enclosed claims.

What is claimed is:

1. A system for collection and presentation of subscriber number information associated with a calling telephone subscriber, the system being connected to a plurality of incoming telephone lines, and said number information being sent by a CTI system signalling over a stationary telecommunication network, the system comprising
    a line processor for each of said incoming telephone lines, said line processor comprising a memory for buffering received number information, said line processor being via a bus connected to a central processor or main processor for collecting and handling number information from all incoming lines,
    a unit at each line processor for conversion of incoming CTI system signals into a binary code constituting number information,
    each line processor additionally comprising subfunctions for handling, and forwarding to said central processor or main processor, received subscriber number information, each line processor having a unique identity, which is transferred to the central processor or main processor together with said number information for subsequent presentation; and
    a personal computer interconnected to said central processor or main processor to receive, process and store incoming information, in accordance with an own control program, and to display information processed.

2. The system according to claim 1, wherein the number of line processors is equal to the number of incoming telephones lines to be supervised, the unique identity of the line processors stating a specific incoming telephone line.

3. The system according to claim 1, wherein the line processor is constituted of a single chip processor, this containing in part the memory in the form of an internal read/write memory for buffering of received subscriber number information and in part an internal programmable read memory for fixed definition of functions of said line processor.

4. The system according to claim 1, wherein said bus contains in part a number of data lines for a transfer of a binary code constituting number information, and in part an additional number of lines for a transfer of control signals.

5. A method for presentation of subscriber number information associated with a calling telephone subscriber, the incoming call being received on one of a multiplicity of incoming telephone lines, and said subscriber number information associated with the calling telephone subscriber being sent by a CTI system signalling over a stationary telecommunication network, comprising the steps of
    connecting each of said incoming lines to a line processor via a CTI signal converter for reception of said subscriber number information sent by the CTI system signalling;
    converting the received CTI system signals in said line processor by means of a first subfunction into a binary code for buffering in a memory;
    transferring said binary code and a unique address for the line processor by means of a second subfunction over a common bus to a central processor or main processor having a main function for collecting and handling incoming number information;
    transferring said number information from the central processor or main processor to a personal computer by means of a third subfunction, to receive, process and store incoming information in accordance with a control program in said personal computer; and
    presenting, by means of said personal computer, said number information associated with a calling telephone subscriber calling on any one of said multiplicity of incoming telephone lines.

6. A method for presentation of subscriber number information associated with a calling telephone subscriber, the incoming call being received on one of a multiplicity of incoming telephone lines, and said subscriber number information associated with the calling telephone subscriber being sent by a CTI system signalling over a stationary telecommunication network, comprising the steps of
    connecting each of said incoming lines to a line processor via a CTI signal converter for reception of said subscriber number information sent by the CTI system signalling;
    converting the received CTI system signals in said line processor by means of a first subfunction into a binary code for buffering in a memory;
    transferring said binary code and a unique address for the line processor by means of a second subfunction over a common bus to a central processor or main processor having a main function for collecting and handling incoming number information; and
    interpreting and processing of received number information associated with the calling telephone subscriber by means of a personal computer, for appointing suitable measures in connection with a call on anyone of said multiplicity of incoming telephone lines.

7. A system for collection and presentation of subscriber number information associated with a calling telephone subscriber, the system being connected to a plurality of incoming telephone lines, and said number information being sent by a CTI system signalling over a stationary telecommunication network, comprising
    a line processor for each individual telephone line having a memory for buffering, said line processor being via a bus connected to a central processor or main processor for collecting and handling number information from all incoming lines;

a unit at each line processor for conversion of incoming CTI system signals into a binary code constituting number information;

a personal computer interconnected to said central processor or main processor to, in accordance with an own control program receive, process and store incoming information, and to display information processed; and each line processor additionally comprising a number of subfunctions for handling, and forwarding to said central processor or main processor, received number information, each line processor having a unique identity, which is transferred together with number information for presentation.

8. The system according to claim 7, wherein a number of line processors is equal to a number of incoming lines to be supervised, the unique identity of the line processors stating a specific incoming telephone line.

9. The system according to claim 7, wherein the line processor is constituted of a single chip processor, this containing in part the memory in the form of an internal read/write memory for buffering of received subscriber number information and in part an internal programmable read memory for fixed definition of functions of said line processor.

10. The system according to claim 7, wherein said bus contains in part a number of data lines for a transfer of a binary code for number information and in part an additional number of lines for a transfer of a number of control signals.

11. A method for presentation of subscriber number information associated with a calling telephone subscriber, the incoming call being received on one of a multiplicity of incoming telephone lines, by utilizing subscriber number information for each calling subscriber sent by CTI system signalling over a stationary telecom network, comprising the steps of external connecting of each incoming line to a line processor over a CTI signal converter for reception of subscriber number information sent;

conversion of received CTI system signalling in said line processor by means of a first subfunction into a binary code for buffering in a memory;

transfer of said binary code and a unique address for the line processor by means for a second subfunction over a common bus to a central processor or a main processor having a main function for collecting and handling incoming number information;

transferring information from the central processor or main processor to a personal computer by means of a third subfunction, to in accordance with a control program in said personal computer receive, process and store incoming information; and presenting, by means of said personal computer, number information of incoming calls on the multiplicity of incoming telephone lines.

12. The method according to claim 11, further comprising the step of interpretation and processing of received number information by means of said personal computer, for appointing suitable measures in connection with a call on any one of said multiplicity of incoming telephone lines.

* * * * *